(12) United States Patent
Berman

(10) Patent No.: US 7,556,382 B1
(45) Date of Patent: Jul. 7, 2009

(54) ILLUMINATOR THAT OUTPUTS LINEARLY POLARIZED LIGHT AND THAT IS SUITABLE FOR USE IN MICRODISPLAY BASED LIGHT ENGINE APPLICATIONS

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 961 days.

(21) Appl. No.: 10/845,459

(22) Filed: May 13, 2004

Related U.S. Application Data

(60) Provisional application No. 60/470,114, filed on May 13, 2003.

(51) Int. Cl.
*G03B 21/00* (2006.01)
*G03B 21/28* (2006.01)

(52) U.S. Cl. .......................................... 353/31; 353/98

(58) Field of Classification Search ................. 353/102, 353/98, 99, 97, 85, 20; 362/558, 555, 559–561, 362/263, 285, 293, 296–307, 310, 311, 19, 362/217–219; 349/5, 9, 61, 67
See application file for complete search history.

(56) References Cited

U.S. PATENT DOCUMENTS

| | | | | |
|---|---|---|---|---|
| 4,735,495 A | * | 4/1988 | Henkes ......................... | 349/62 |
| 6,840,633 B2 | * | 1/2005 | Davis et al. ................... | 353/98 |
| 2002/0176054 A1 | * | 11/2002 | Mihalakis ..................... | 353/31 |
| 2004/0062024 A1 | * | 4/2004 | O'Connor et al. ............. | 362/19 |

* cited by examiner

*Primary Examiner*—Hung Henry Nguyen
(74) *Attorney, Agent, or Firm*—Martine Penilla & Gencarella, LLP

(57) ABSTRACT

A hollow sphere with a scattering (e.g., white diffusive) interior surface directs light input from at least one input light source to an exit. The exit has a reflective polarizer that passes light of a selected polarization to an output. Light of other polarization(s) is reflected back into the sphere where it becomes unpolarized because of reflections and may eventually be returned to the exit at the selected polarization. The illuminator is well suited as a light source for light management systems of various configurations.

26 Claims, 5 Drawing Sheets

ILLUMINATOR THAT OUTPUTS LINEARLY POLARIZED LIGHT AND THAT IS SUITABLE FOR USE IN MICRODISPLAY BASED LIGHT ENGINE APPLICATIONS

CROSS REFERENCE TO RELATED APPLICATIONS AND CLAIM OF PRIORITY

This invention claims priority to the following co-pending U.S. provisional patent application, which is incorporated herein by reference, in its entirety:

Berman, Provisional Application Ser. No. 60/470,114, entitled "An Illuminator that Outputs Linearly Polarized Light and that is Suitable for use in Microdisplay Based Light Engine Applications,", filed, May 13, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention disclosed in this document is an illuminator that outputs linearly polarized light. More particularly, the illuminator is suitable for incorporation in LCoS microdisplay based light engines of the type used in video projector applications.

2. Discussion of Background

A block drawing of a set of components 100 behind the screen of a LCoS microdisplay based rear projection video display (such as a TV) is illustrated in FIG. 1. To the left of FIG. 1, the light source 102 and condenser 104 elements are collectively called the illuminator 110. FIG. 1 also illustrates a kernel 120 projection lens 130 fresnel lens and projection screen 140. The kernel 120 includes light management system including LCoS microdisplays 122A-122C.

The light source 102 is usually a mercury short arc lamp. This type of lamp emits an output light beam that is round and has a spatially non-homogeneous intensity profile. One function of the condenser 104 is to shape and size the output light beam 106 to match that of the rectangular microdisplays 122A-122C of the kernel 120 and to homogenize the light intensity within the output light beam 106. Other functions of the condenser 104 are to set the f# of the illuminator output light beam 108 and to remove the infrared and the ultra violet portions of the light source emission spectrum. Some condensers 104 also remove undesired portions of the visible spectra from the illuminator output light beam 108. (A common example of this function is the removal of the "yellow" spike from the emission spectra produced by the mercury short arc lamp.) Additional requirements placed on the illuminator 110 are that it be physically compact and inexpensive.

The subject of this disclosure relates to the polarization of the output light beam 106 from the illuminator 110. The lamp 102 itself outputs unpolarized light. In many applications the illuminator output light beam 108 is also unpolarized light and this is acceptable. Other applications require that the illuminator output light beam 108 is linearly polarized light.

There are a number of conventional techniques known to the art by which to produce an illuminator 110 that outputs linearly polarized light. Three of the more widely used techniques are as follows:

- The inclusion of a linear polarizer in the illuminator 110. The polarizer is typically a PBS or a reflective polarizer. In either case, the big disadvantage of this approach is the loss of a minimum of half the light produced by the illuminator 110.
- The inclusion of a so-called "fly's eye" recombination system into the illuminator 110. Such an illuminator 110 includes a lamp 102 with a parabolic reflector 103, a fly's eye lens, a polarization rotator array plate and a second fly's eye lens. This type of system requires careful alignment and is quite expensive.
- The inclusion of an integrating rod based recombination system into the illuminator 110. Such an illuminator 110 includes a lamp 102 with an elliptical reflector and a modified integrating rod. The modification consists of the addition of a reflective aperture and a quarter waveplate at the input end of the rod and the addition of a reflective polarizer at the rod output. The resulting illuminator 110 certainly outputs linearly polarized light but the intensity is found to be only a modest increase over the approach of simply inserting a polarizer into the illuminator 110.

SUMMARY OF THE INVENTION

The present inventors have realized an improved illuminator. The illuminator is particularly well suited for projection systems and LCoS projection televisions. In one embodiment, the present invention provides a device, comprising, an integrating enclosure having an entrance aperture, an exit aperture, and a reflective linear polarizer coupled to the exit aperture.

In another embodiment the present invention is an illuminator, comprising, an integrating enclosure having an entrance aperture and an exit aperture, at least one light source coupled to the entrance and configured to direct light into the integrating enclosure, and a reflective linear polarizer coupled to the exit.

In yet another embodiment, the present invention is a Liquid Crystal on Silicon (LCoS) projection television, comprising, a light management system comprising, a prism assembly having an input face, a set of processing faces, and an output face, the prism assembly being configured to split an input light beam into component light beams, individually direct the component light beams to an individual one of the processing faces, recombine portions of the component light beams reflected from the processing faces, and output the recombined light beams through the output face, and a light source, comprising, an integrating enclosure having an entrance aperture, an exit aperture, and a reflective linear polarizer coupled to the exit aperture, wherein, the prism assembly further comprises a set of reflective microdisplays, each microdisplay is mounted on one of the processing faces and configured to modulate and reflect light directed at the processing face upon which the microdisplay is mounted, and each microdisplay is configured to modulate light with content corresponding to a color of the component light beam directed at the processing face upon which the microdisplay is mounted.

The present invention includes a method of producing light suitable for use in an optical device, comprising the steps of injecting light into a diffuse scattering enclosure having a polarization sensitive reflector, and directing light emanating from the polarization sensitive reflector to an integrating rod. The light from the integrating rod is then provided to a kernel of an image projection system, such as a LCoS projection television.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The invention disclosed in this document is an illuminator configured to output linearly polarized light. The disclosed illuminator is compact, inexpensive, highly efficient, and is well suited for light management systems, particularly for use in projection televisions and other applications.

Figure 1:
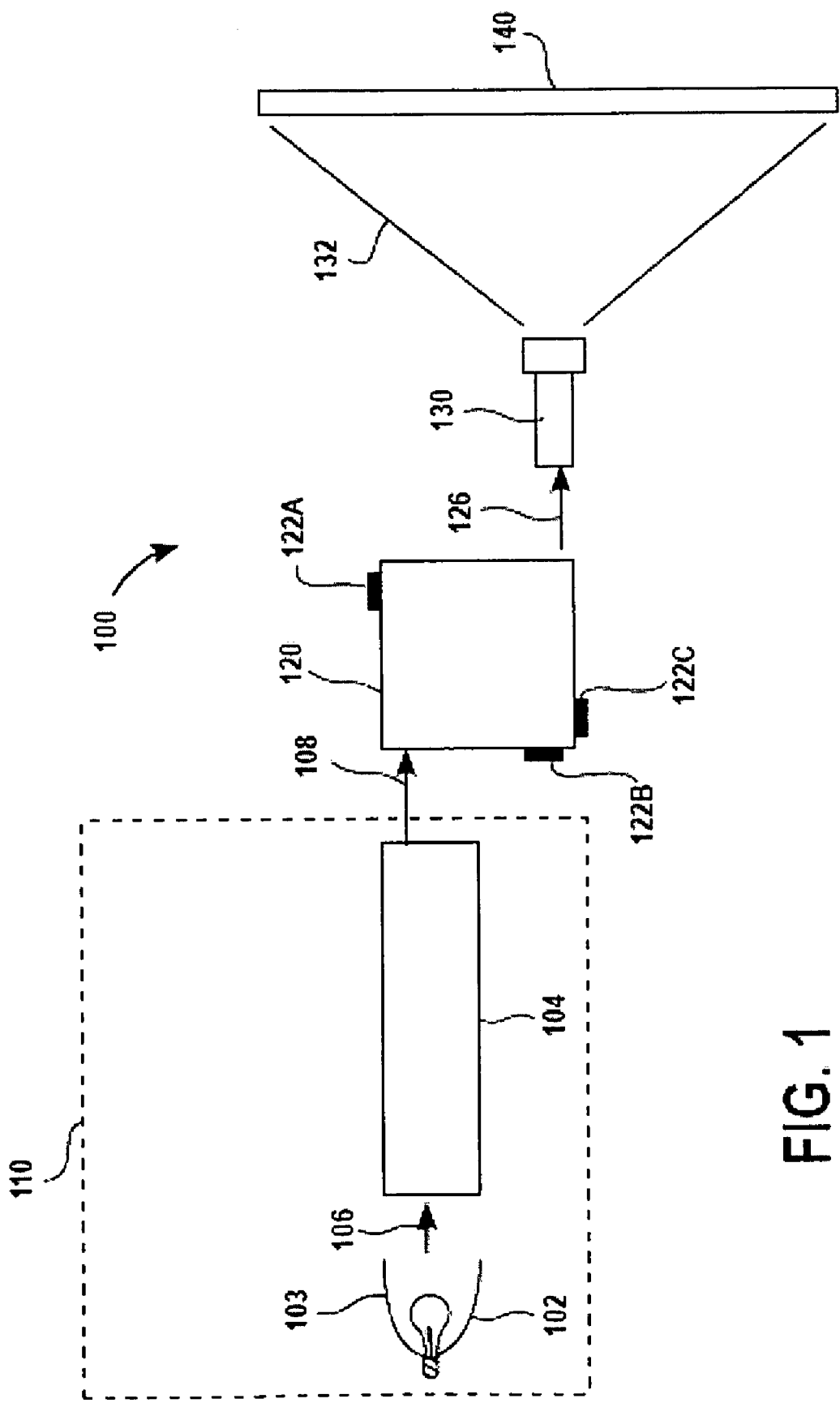
FIG. 1 is a block diagram of a LCoS microdisplay based video projector according to an embodiment of the present invention.
Figure 2:
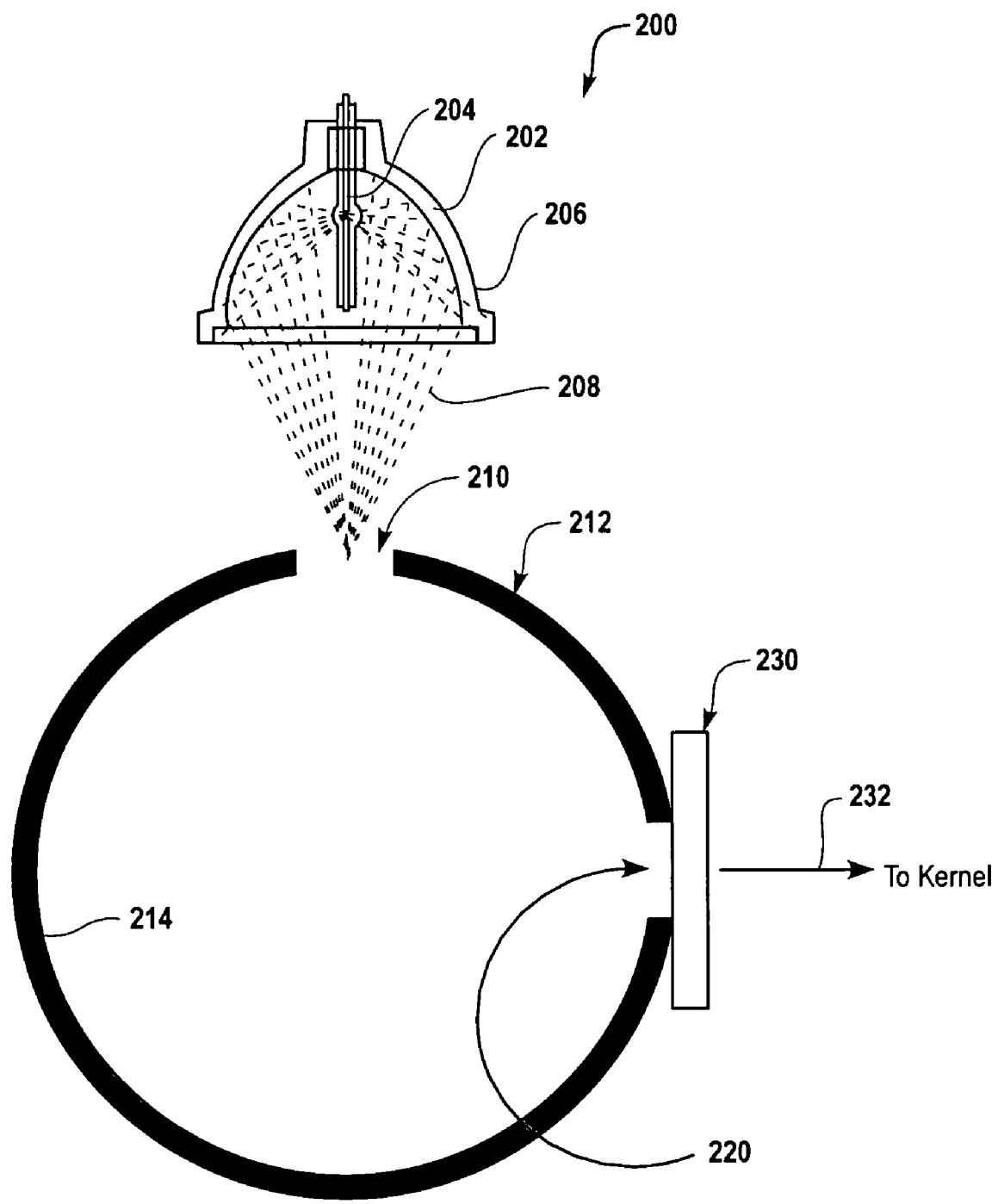
FIG. 2 is an illustration of key components of an illuminator that outputs linearly polarized light according to an embodiment of the present invention.

The basic configuration of the illuminator 200 is illustrated in FIG. 2. As shown, the light source 202 is a short arc lamp 204 with an elliptical reflector 206. The non-homogeneous, unpolarized light beam 208 produced by the lamp 204 is focused through a small entrance aperture 210 in the wall of an integrating enclosure 212 e.g., hollow sphere. Once in the sphere 212, the light beam 208 is scattered by impact with the interior wall 214 of the sphere 212. The scattering serves to homogenize the intensity of the light within the sphere 212. Some of the light eventually encounters the exit aperture 220.

A reflective linear polarizer 230 is positioned at the exit aperture 220. One polarization of light 232 (S for example) is passed by the reflective polarizer 230 and leaves the integrating enclosure 212 via the exit aperture 220. In one embodiment, the exit aperture 220 is shaped in proportion to the shape of a light modulator or other device that eventually operates on or interacts with light beam 232 that has exited the illuminator 200. In one embodiment, the exit aperture 220 is rectangularly shaped in proportion to a reflective LCoS microdisplay. The other polarization, the P component, is reflected back into the sphere 212. This portion of the light beam once again reflects multiple times within the sphere 212. In doing so, the light is fully depolarized. Eventually, some of the light will encounter the exit aperture 220 where, once again, the S polarized component light beam 232 will be transmitted. The P polarized component is again recirculated. Since the sphere 212 can be highly efficient, most of the light eventually leaves the sphere 212 with a S polarization.

An optional integrating rod (not shown) can further shape and spatially homogenize the intensity of the S polarized light beam 232. The S polarized light beam 232 then enters other optical components (not shown) that, for example, further focus, filter, shape, and/or modulate the light beam 232.

Several points concerning the configuration of the disclosed illuminator are as follows:

The illuminator 200 can output either P or S linearly polarized light beam 232. The orientation of the axis of linear polarization is determined by the orientation of the transmission axis of the reflective polarizer 232 located at the exit aperture 220.

The integrating enclosure 212 can be a hollow ball (e.g., sphere) in which the inner wall 214 is coated with a highly scattering material (e.g., white material such as aluminum oxide or magnesium oxide). Alternately, the integrating enclosure 212 can be made of a solid material such as glass that is coated on the outside with a highly reflective or scattering (e.g., white) material.

It is possible to increase the light beam 232 output by the illuminator 200 by having two or more lamps input light 208 into the integrating sphere 212.

Figure 3:
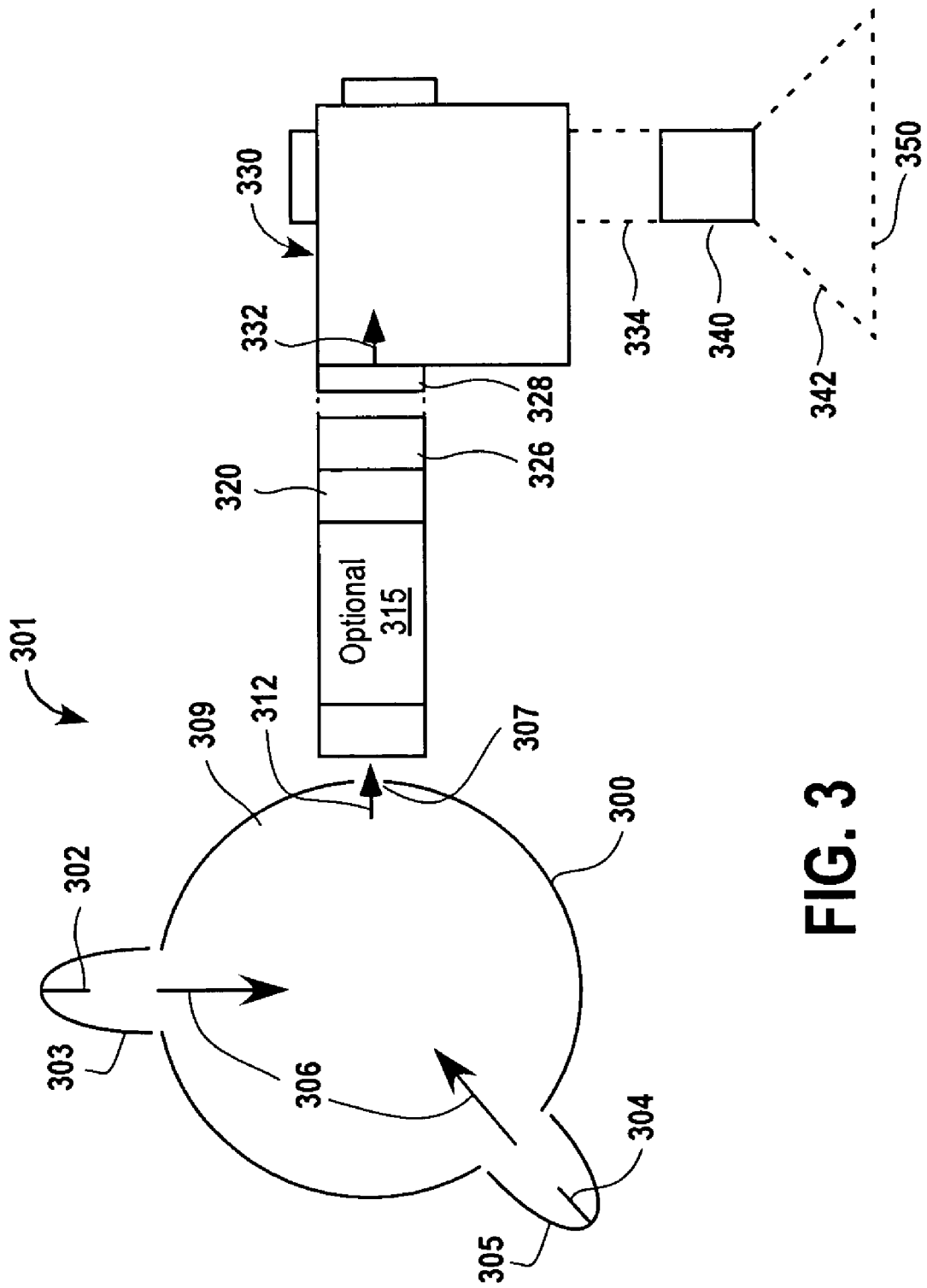
FIG. 3 is an illustration of a light management system having a dual lamp illuminator according to an embodiment of the present invention.

FIG. 3 is an illustration of a light management system 301 having a dual lamp illuminator 300 according to an embodiment of the present invention. The illuminator 300 has 2 lamps (lamp #1 302 and lamp #2 304) inputting unpolarized light 306 into a scattering sphere 309, output light beam 312 passes through a reflective polarizer 310, optional integrating rod 315, optional cleanup polarizer 320, UV and IR filters 326, and additional lenses 328. The integrating rod 315 (a.k.a. light pipe) further conditions the light beam 312 exiting the scattering sphere 309. The further conditioning includes, for example, further homogenization, and adjustment of an f# of the light beam 312 e.g., adjusting, for example, the rectangular size of the polarized light beam. The output light beam 332 is input into a kernel 330 where it is manipulated to integrate a video image 334. The video image 334 exits the kernel 330, is focused by lens 340 and the focused light beam 342 is then projected onto screen 350.

One technique to increase the degree of linear polarization of the output light beam 332 is to include a "clean up" reflective polarizer 320 at the output of the integrating rod 315. The transmission axis of the clean up reflective polarizer 320 should be parallel to that of the linear linear polarizer 310 at the sphere exit aperture 307.

Figure 4:
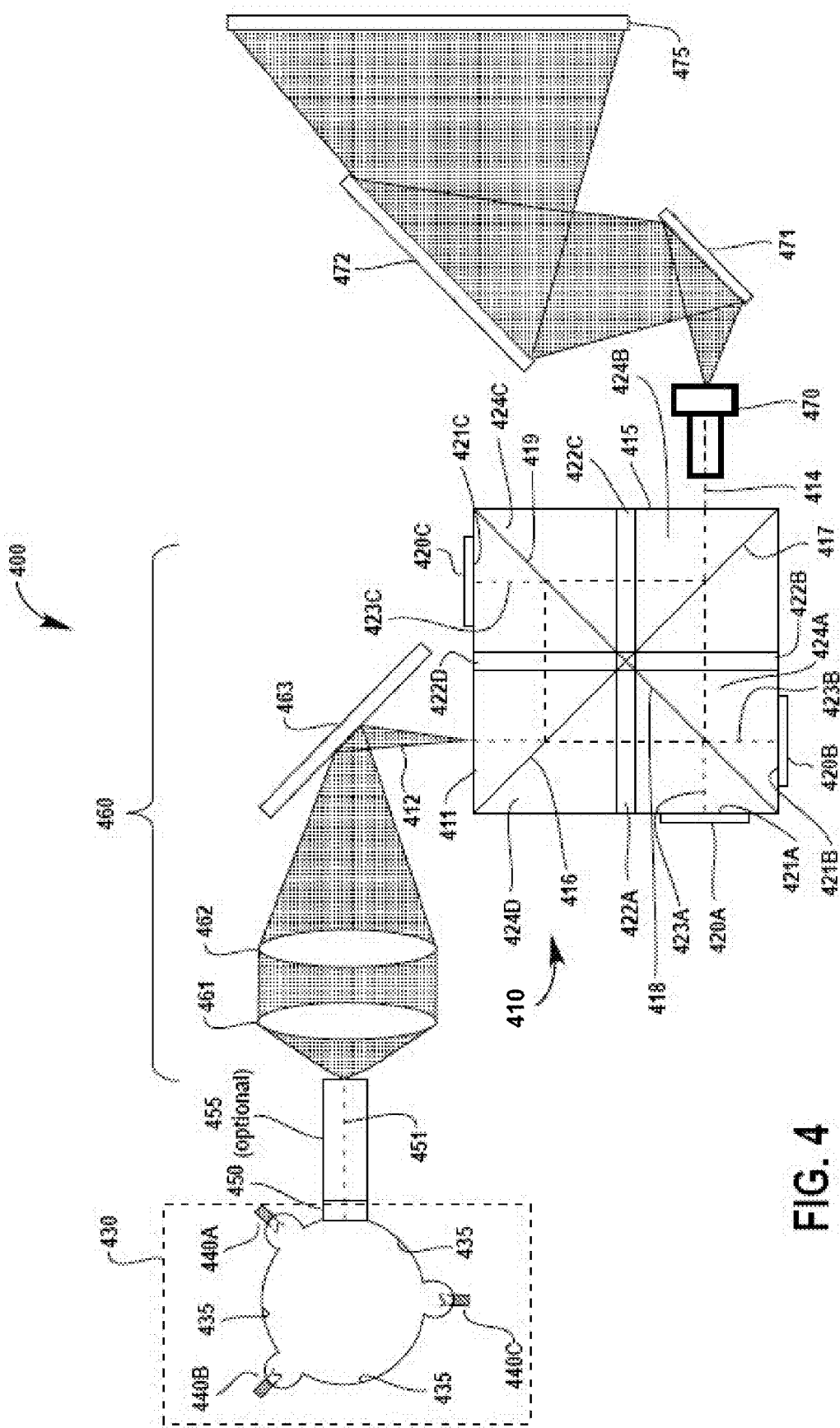
FIG. 4 is a drawing of major components of a Liquid Crystal on Silicon (LCoS) projection display device according to an embodiment of the present invention.

FIG. 3 is an example embodiment. Many other configurations of kernels 330, or other post light source devices may utilize the illuminator 300. Furthermore, as discussed herein, the illuminator 300 may be configured with one, two, or more light sources 302, 304, e.g., three light sources 440A-C as shown in FIG. 4. The light sources 302, 304 may be similar to each other, or they may be light sources that are of different specifications. For example, lamp #1 302 may be stronger in red wavelengths and lamp #2 301 may be stronger in blue or green wavelengths. The qualities of any one or more lamps 302, 304 to be selected based on system and engineering requirements. The light sources 302 304 can also include respective reflectors 303, 305. The reflectors 303, 305 can be elliptical reflectors.

FIG. 4 is a drawing of major components of a Liquid Crystal on Silicon (LCoS) projection display device 400 according to an embodiment of the present invention. The display-device 400 includes kernel 410 which comprises a prism assembly 413 and a set of reflective LCoS microdisplays 420A, 420B, and 420C. Each of the microdisplays 420A, 420B, and 420C are energized by microdisplay electronics (not shown) with content corresponding to a component color of an image being displayed by the display device. The microdisplay electronics, for example, split a video image into streams of digital data content, each stream corresponding to one of the color components. The component colors are, for example, Red, Green, and Blue, and/or combinations of other component colors.

The prism assembly 413 is an assembly of beam splitting components (e.g., Polarizing Beam Splitters, PBSs, Dichroic Beam Splitters, etc.) and optical elements (e.g., dichroics, filters, waveplates, etc.) configured to split input light 412 into a set of component light beams, direct each component light beam to a processing face 421A, 421B, 421C of the kernel 410 prism assembly 413. After passing through the corresponding processing face 421A, 421B, 421C, each component light beam is modulated by reflection from the corresponding microdisplay 420A, 420B, 420C and returns back through the processing face 421A, 421B, 421C. The prism assembly 413 of kernel 410 illustrates three processing faces 421A, 421B, 421C, one corresponding to each microdisplay 420A, 420B, 420C.

Each microdisplay 420A, 420B, 420C is, for example, non-movably mounted either directly or via a mounting mechanism to its corresponding processing face 421A, 421B, 421C (e.g., a bezel surrounding an optical area of the microdisplay 420A, 420B, 420C which may include a sealed reservoir of index matching fluid coupling the optical area of the microdisplay 420A, 420B, 420C to the processing face 421A, 421B, 421C). Each microdisplay 420A, 420B, 420C is energized with the component color corresponding to the component light beam 423A-C directed to its processing face 421A, 421B, 421C. The component light beam 423A-C is then modulated and reflected by the microdisplay 420A, 420B, 420C. The prism assembly 413 combines the modulated reflected component light beams and directs the combined light beam 414 to an exit face 415 where the combined light beam 414 is projected through lens 470 and reflect off mirrors 471, 472 onto a display screen 475. In one embodiment, the display screen 475 is the display of a LCoS projection television.

The prism assembly 413 of kernel 410 is, for example, a quad style prism assembly 413 comprising 4 beam splitting components 424A-424D arranged in a cube. In one embodiment, an image projector according to the present invention includes a prism assembly 413 in which the main optical components of the prism assembly 413 (beam splitters 424A-424D) are liquid coupled. The beam splitters 424A-424D are set, for example, in prism assembly 413 pathlength matched positions with joints 422A-422D between the beamsplitters 424A-424D. The joints 422A-422D are filled with liquid (e.g., an index matching fluid). A frame and/or a mounting plate in conjunction with an adhesive or other seal maintains the fluid within the prism assembly 413. Optical elements such as ColorSelects (wavelength specific retarder products by ColorLink Corporation), dichroics, etc, if needed for the prism assembly 413 design, may also be inserted into the joints 422A-422D and immersed in the index matching fluid. The beam splitters 424A-424D each comprise 2 prisms abutted on their diagonals 416, 417, 418 and 419 and set in beamsplitter pathlength matched positions. A beam splitting layer is disposed on one or both of the diagonals 416, 417, 418 and 419. The beam splitting layer may be any of, for example, a polarizing beam splitting thin film (a PBS beamsplitter), a single color cholesteric layer, two cholesteric layers of different colors (Cholesteric based Beam Splitters—CBSs), a dichroic layer, or any other material that can perform beam splitting.

Pathlength matched prism assemblies 413 may be described, for example, as prism assemblies where light pathlengths between faces of the beam splitting components having microdisplays 420A, 420B, 420C mounted thereon (processing faces 421A, 421B, 421C of the prism assembly 413) and a reference plane are equivalent. For example, pathlength distances from any of the processing faces 421A, 421B, 421C to a reference plane (such as an exit face 415 of the prism assembly 413, or, for example, an intermediate focal plane 416, 417, 418 or 419) are equivalent. Thus, individual light beams in each of the separately colored light beams corresponding to a same image pixel, once modulated and reflected off the microdisplays 420A, 420B, 420C, and after passing back through its corresponding processing face 421A, 421B, 421C, arrive at the reference plane 415, 416, 417, 418, 419 after traveling the same distance. And, since the pathlengths within the prism assembly 413 are matched (a pathlength matched prism assembly), distances traveled within the prism assembly 413 by the light beams modulated and reflected from the microdisplays 420A, 420B, 420C are also the same.

The prism components themselves are not precise enough, particularly in mass quantity production, to affirmatively bond the prism components directly together and end up with matched pathlengths in the prism assembly. However, Berman et al., U.S. patent application Ser. No. 10/202,595, filed Jul. 24, 2002, now issued as U.S. Pat. No. 6,999,237, entitled "Method and Apparatus for Configuration and Assembly of a Video Projection Light Management System", the contents of which are incorporated herein by reference in their entirety, describes construction of a pathlength matched prism assembly 413 in which standard mass produced optical components may be arranged in pathlength matched positions (e.g., fixed to a plate or frame, and then joints 422A-422D between the components are filled with an optical coupling fluid such as mineral oil or other commercially available index matching fluid). All of the devices and construction techniques described in the above referenced patent application may be applied to the construction of prism assemblies 413 with cholesteric based beam splitting devices as well.

In addition, individual beam splitting components of the prism assembly 413 may themselves be constructed as pathlength matched beamsplitters (beamsplitters 424A-424D set in beamsplitter pathlength matched positions). Construction techniques for pathlength matched beamsplitters are described in Detro, U.S. patent application Ser. No. 10/251,225, filed Sep. 20, 2002, now issued as U.S. Pat. No. 6,809,874, entitled "Pathlength Matched Beam Splitter and Method and Apparatus for Assembly", the contents of which are incorporated herein by reference in their entirety.

Input light 412 is directed at an input face 411 of kernel 410. The input light 412 is, for example, polarized light that has been homogenized, shaped, and had undesirable wavelengths (e.g., UV light) removed.

An illuminator 430 comprises a curved (e.g., spherical) interior surface 435. The illuminator 430 includes at least one light source. In this example, the illuminator 430 comprises 3 light sources, 440A, 440B, and 440C. The light sources 440A, 440B, and 440C are, for example, light sources having a consistent visible light spectra. In one embodiment, the light sources 440A, 440B, and 440C have different spectras. For example, light source 440B is a light source that is stronger in red or blue wavelengths compared to one or more of the other light sources 440A, 440C. The selection of light sources 440A, 440B, and 440C and the spectra of the individual light sources are chosen to provide a balanced spectra to the human eye in image projected onto the display screen 475. For example, if the optical components of the prism assembly 413 and light integrator are made of glass, and therefore highly absorptive of blue wavelengths, the light sources 440A, 440B, and 440C may be chosen to emphasize blue wavelengths. Counterbalancing any such selection are considerations as to the sensitivity of the human eye.

A polarizing element 450 provides polarized light 451 which enters a light integrating stick 455. The polarizing element 450 is, for example, a p-polarized light reflector, and operates as discussed above so that the light entering the light integrating stick 455 is s-polarized. In another embodiment, the polarizing element 450 is a s-polarized light reflector so that light entering the light integrating stick 455 is p-polarized.

When utilized, the light integrating stick 455 further homogenizes and shapes the polarized light 451. However, the integrating stick 455 is optional because the integrating enclosure 430 itself homogenizes and shapes the light. Lenses 461, 462 and mirror(s) 463 direct the polarized, homogenized, and shaped light 412 to the input face 411 of the kernel 410.

Figure 5:
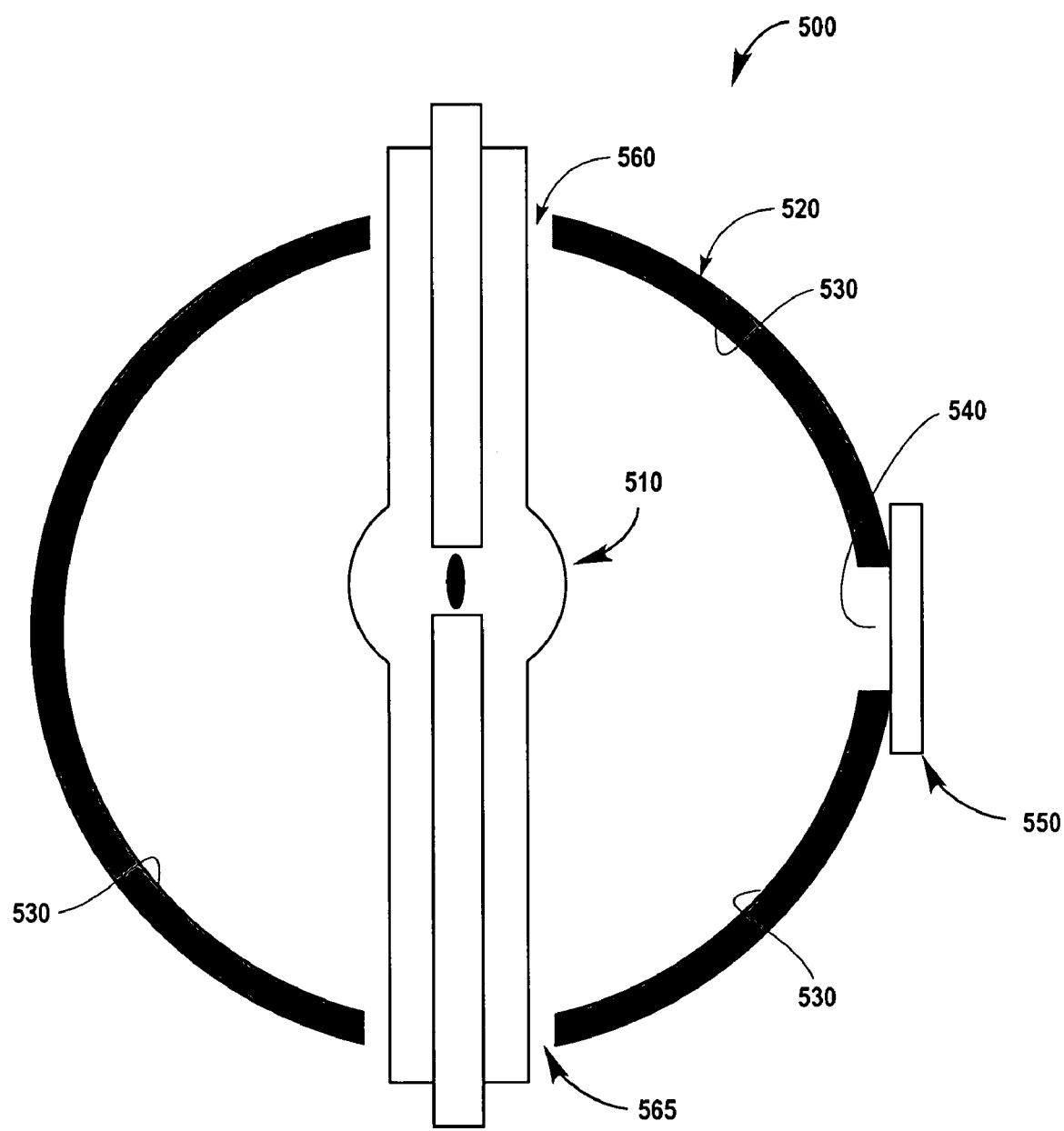
FIG. 5 is a drawing of an enclosed lamp illuminator according to an embodiment of the present invention.

FIG. 5 is a drawing of an enclosed lamp illuminator 500 according to an embodiment of the present invention. A light source 510 is enclosed within an integrating enclosure 520. In the illustrated embodiment, the integrating enclosure 520 is a sphere, however, other shapes may be utilized. By fully enclosing the light source 510, there is no need for a reflector on the lamp 510.

Light emitted by the lamp 510 is scattered by impact with a highly scattering wall 530 of the integrating enclosure 520. Multiple reflections or scattering of light impacting the wall 530 serves to homogenize the intensity of the light within the integrating enclosure 520. Some of the light eventually encounters an exit aperture 540. A reflective linear polarizer 550 is positioned at the exit aperture 540. One polarization of light (S polarization for example) exits the enclosure 520 through the exit aperture 540 and is passed by the reflective polarizer 550.

The exit aperture 540 provides shape to the polarized light beam produced by the illuminator 500. Likely shapes are round, square, or rectangular. Preferably, the exit aperture 540 is shaped in proportion to a "display" or optical area of a modulator configured to operate on the light exiting the enclosure 520. The modulator itself is proportional to, for example, a modern wide screen television and/or monitor.

The other polarization, the P component, is reflected back into the integrating enclosure 520 (e.g., hollow sphere). This portion of the light beam once again reflects multiple times within the integrating enclosure 520. In doing so, the light is fully depolarized. And, eventually, some of the depolarized light will encounter the exit aperture 540 where, once again, the S polarized component will be transmitted. The P polarized component is again recirculated. Since the integrating enclosure 520 can be highly efficient, most of the light eventually leaves the integrating enclosure 520 with a S polarization.

Several points concerning the configuration of the illuminator 500 illustrated in FIG. 5 are as follows:

The illuminator 500 can output either P or S linearly polarized light. The orientation of the axis of linear polarization is determined by the orientation of the transmission axis of the reflective polarizer 550 located at the exit aperture 540.

The integrating enclosure 520 can be a conventional hollow ball in which the inner wall 530 is coated with a highly reflective white material.

Alternately, the integrating enclosure 520 can be a cavity in a block of highly reflective ceramic. In this case, the enclosure 520 may be formed from two or more components.

One advantage of the disclosed approach is that it is possible to utilize an arc lamp with a larger arc gap. Such a light source will generally have a longer life time than a lamp with a shorter arc and that outputs a similar total amount of light.

As noted in FIG. 5, the lamp 510 is centered in the enclosure 520. In other embodiments, the lamp 510 is positioned off center. An off-center position of the lamp 510 may be advantageous in that more or all of the light impacting the reflective polarizer 550 is reflected or further homogenized before exiting the enclosure 520.

It is desirable to cool the lamp 510. In the illustrated embodiment, air can be injected into the integrating enclosure 520 at one end 560 of the lamp 510 and withdrawn at the other end 565. As shown in FIG. 5, the integrating enclosure 520 is open at opposite ends 560, 565 of the lamp 510 allowing for air flow in 560 and air flow out 565. Openings at opposite ends 560, 565 of the enclosure 520 facilitate placement of the lamp 510 in the enclosure 520 and for the provision of electrical connections to the lamp 510. In addition, the illustrated arc lamp 510 has a shadow, or at least a penumbra at opposite ends of the lamp, and cooling openings 560, 565 and electrical connections at these positions will have less adverse effects on the overall efficiency of the illuminator 500. Thus, the present invention includes placement of air openings 560, 565 and other aberrations (e.g., electrical connections) of the integrating enclosure 520 at a shadow or penumbra of the lamp 510.

Although the present invention is mainly directed at illuminators, the following U.S. Patent Applications are incorporated herein by reference, in their entirety, each providing one or more techniques that are combinable with the present invention to produce high quality light management systems and/or other optional products:

Berman et al., U.S. patent application Ser. No. 10/342,219 entitled "Design Of Prism Assemblies And Kernel Configurations For Use In Projection Systems" filed Jan. 13, 2003, now issued as U.S. Pat. No. 6,909,556;

Berman, U.S. patent application Ser. No. 10/382,766 entitled "Method and Apparatus for Increasing Microdisplay Black State in Light Management Systems and Flexibility to Utilize Polarized or Unpolarized Input Light" filed Mar. 5, 2003, now issued as U.S. Pat. No. 7,280,281;

Berman, U.S. Provisional Patent Application No. 60/405, 462 entitled "Prism Assembly With Cholesteric Reflectors" filed Aug. 23, 2002, which was converted to non-provisional U.S. patent application Ser. No. 10/646,291, filed on Aug. 22, 2003 and issued as U.S. Pat. No. 6,982,829; and Berman et al., U.S. patent application Ser. No. 10/371,835 entitled "Method And Apparatus For Use And Construction Of Compensated Higher Order Waveplates" filed Feb. 20, 2003, now issued as U.S. Pat. No. 6,934,066.

Any of the light sources illustrated in the referenced patent applications or light sources used in conjunction with any devices described therein may be replaced with a light source according to the present invention. The light source so replaced may then be "tuned" as described herein to provide optimal or near optimal spectra for any particular application.

Obviously, numerous modifications and variations of the present invention are possible in light of the above teachings. It is therefore to be understood that the invention may be practiced otherwise than as specifically described herein.

What is claimed and desired to be secured by Letters Patent of the united states is:

1. A device, comprising:
   an integrating enclosure;
   a light source enclosed within the integrating enclosure, wherein a spectral emission of the light source is selected to counterbalance any wavelengths that are absorbed by the device;
   an exit aperture on the integrating enclosure; and
   a reflective polarizer coupled to the exit aperture.

2. The device according to claim 1, wherein an interior surface of the integrating enclosure is reflective.

3. The device according to claim 1, further comprising:
a light management system coupled to the reflective polarizer, the light management system including a prism assembly, the prism assembly including:
an input face;
a set of processing faces;
a set of reflective microdisplays, each microdisplay is mounted on a corresponding one of the processing faces and configured to modulate and reflect light directed at the processing face upon which the microdisplay is mounted; and
an output face, the prism assembly being configured to split an input light beam into component light beams, individually direct the component light beams to an individual one of the processing faces, recombine portions of the component light beams reflected from the processing faces, and output the recombined light beams through the output face.

4. The device according to claim 1, wherein the integrating enclosure is included in a liquid crystal on silicon video projection system.

5. The device according to claim 4, wherein the liquid crystal on silicon video projection system is included in a projection television.

6. The device according to claim 1, wherein a spectral emission of the light source is selected to counterbalance any wavelengths that are absorbed by the device includes emphasizing blue wavelengths when compared to other wavelengths emitted from the light source.

7. The device according to claim 1, wherein the spectral emission of the light source is counterbalanced to a sensitivity of a human eye.

8. The device according to claim 1, further comprising at least one vent opening in the integrating enclosure.

9. The device according to claim 1, wherein the reflective polarizer is a p-polarized light reflector.

10. The device according to claim 1, wherein the reflective polarizer is a s-polarized light reflector.

11. The device according to claim 1, wherein an interior of the integrating enclosure is spherical.

12. The device according to claim 1, wherein the integrating enclosure comprises a sphere shaped interior.

13. The device according to claim 1, further comprising an integrating rod coupled to the exit aperture via the reflective polarizer.

14. The device according to claim 3, further comprising a integrating rod coupled to the reflective polarizer and a cleanup polarizer disposed between the integrating rod and the prism assembly input face.

15. The device according to claim 1, wherein the light source is a short arc length mercury lamp.

16. The device according to claim 1, wherein the light source is a medium arc length mercury lamp.

17. The device according to claim 1, wherein the light source is a large arc length mercury lamp.

18. The device according to claim 8, wherein the vent opening is in a penumbra of the light source.

19. The device according to claim 8, wherein the vent opening is in a shadow of the light source.

20. The device according to claim 8, wherein the at least one vent opening includes two vent openings and wherein a coolant source is coupled to at least one vent opening such that the coolant can flow through the integrating enclosure.

21. The device according to claim 20, wherein the coolant source is a cooling air source.

22. The device according to claim 1, wherein the reflective polarizer is a-linear polarizer.

23. The device according to claim 1, wherein the reflective polarizer passes a selected polarized component of the light in the integrating enclosure and reflects any other polarized component of the light in the integrating enclosure into the integrating enclosure.

24. A device, comprising:
an integrating enclosure;
a light source enclosed within the integrating enclosure;
an exit aperture on the integrating enclosure; and
a reflective polarizer coupled to the exit aperture, wherein the exit aperture has a shape proportional to a optical area of a modulator configured to operate on the polarized light exiting the integrating enclosure.

25. The device according to claim 1, wherein the integrating enclosure is a hollow ball having an inner wall and the inner wall including a highly reflective material.

26. A device, comprising:
an integrating enclosure;
a light source enclosed within the integrating enclosure;
an exit aperture on the integrating enclosure; and
a reflective polarizer coupled to the exit aperture, wherein the integrating enclosure is a cavity in a highly reflective ceramic material.

* * * * *